Dec. 2, 1969 HISASHI KANEKO 3,482,044

SYNCHRONIZING DEVICE FOR A PULSE CODE TRANSMISSION SYSTEM

Original Filed Aug. 27, 1963 2 Sheets-Sheet 1

Inventor
H. KANEKO
By R.P. Morris
Attorney

SYNCHRONIZING DEVICE FOR A PULSE CODE TRANSMISSION SYSTEM

Inventor
H. KANEKO
By [signature]
Attorney

United States Patent Office 3,482,044

Patented Dec. 2, 1969

3,482,044

SYNCHRONIZING DEVICE FOR A PULSE CODE TRANSMISSION SYSTEM

Hisashi Kaneko, Tokyo, Japan, assignor to Nippon Electric Company, Limited, Tokyo, Japan, a corporation of Japan Continuation of abandoned application Ser. No. 304,857, Aug. 27, 1963. This application Apr. 13, 1967, Ser. No. 642,987

Claims priority, application Japan, Aug. 29, 1962, 37/36,944

Int. Cl. H04l 5/22

U.S. Cl. 178—53 7 Claims

This invention relates to a synchronizing device for a system employing coded pulse transmission, and more particularly to the receiver synchronizing device.

The present application is a continuation of application Ser. No. 304,857, filed Aug. 27, 1963 and now abandoned.

In this specification, the invention will be explained with particular reference to a time-division multiplex pulse code modulation (PCM) transmission system. The synchronizing device of the invention, however, may equally be applied to a digital information transmission system, an electronic computer, a digital information storing system, etc.; all of which will be generically referred to herein as a "pulse code transmission system."

It is often the practice to provide a clock pulse generator and a channel separator or stepping device in the receiver of the foregoing type transmission system. The clock pulse generator extracts the bit frequency component from the received PCM pulse series to generate clock pulses. The channel separator steps in response to the supplied clock pulses to produce a pulse, or step pulse, at each time position of the clock pulses (or each bit position) spaced by a preselected time interval at the plurality of stepping postions. The produced pulse is used to operate a decoder. The synchronizing device determines that time position in the bit positions of the received PCM pulse series at which the channel separator should produce the step pulse on a particular one of the stepping positions.

If the sequence of pulses sent out at the transmitter are received by the receiver in the form originally sent, then the receiving equipment may be easily kept in synchronism. However, defects in the transmission media, such as instantaneous interruptions in the line, fading, sudden noise increases, and the like erroneously shift the stepping of the channel separator from the desired synchronization state, as determined by the prescribed arrangement of pulses over a predetermined number of time positions assigned to the synchronizing channel, resulting in a collapse of synchronism. Collapse of synchronism further occurs due to the spurious addition of pulses in the clock pulse train through the influence of noise mingling into the PCM pulse series during its transmission through the transmission line and also occurs due to the Doppler effect when one end of the time-division multiplex PCM transmission system is in a rocket or an artificial satellite, and the other end is fixed at a point on earth.

Synchronizing devices hitherto proposed may broadly be classified into the start-stop type, and the feedback type.

An example of the start-stop type synchronizing device may be found in the "Bell System Technical Journal," 1960 January issue, pp. 37–38; particularly FIG. 3 on p. 38. As may be seen in this paper, the start-stop synchronizing device is so arranged that synchronizing patterns may be detected by a synchronizing pattern detector which is directly connected to the input terminal and causes stepping of the channel separator. It follows therefore that appearance in the input PCM pulse series, of a pulse combination which is the same as the prescribed combination of pulses of the synchronizing pattern, will cause the channel separator to erroneously begin the stepping at a bit position which is not in the synchronizing pattern. A decrease in the number of bit or time positions allotted to the synchronizing pattern will enhance the possbility of the synchronizing pattern detector picking up such a false synchronizing pattern. Although the start-stop type has a short sychronism restoration time feature, this feature may be nullified by the danger of very frequent loss of synchronism caused by false synchronizing patterns.

Examples of feedback synchronizing devices are described in "Bell Laboratories Record," 1949 January issue, pp. 62–68, and also in my U.S. Patents Nos. 3,065,302 and 3,069,504. The feedback synchronizing device comprises a clock pulse generator for producing the clock pulses for stepping the channel separator in response to the bit-frequency component of the input PCM pulse series; a synchronism monitor for monitoring whether or not the successive output step pulses appearing at those stepping positions of the channel separator which are allocated to the synchronizing channel coincide with the prescribed synchronizing pattern; and logic circuits for inhibiting the clock pulses to be supplied to the channel separator for delaying the stepping of the channel separator where an error is detected by the synchronizing monitor.

In the synchronizing device disclosed in Patent No. 3,069,504, the arrangement is such that synchronism may be restored by resetting the channel separator to a particular stepping position in response to the synchronism monitor output. A feedback synchronizing device wherein the channel separator is controlled in a feedback manner by virtue of monitoring the synchronizing channel output of the channel separator removes the above-mentioned defects of start-stop synchronizing devices but requires a larger synchronism restoration time (although the device of Patent 3,069,504 has somewhat shorter synchronism restoration time than that disclosed in Patent 3,065,302).

These synchronizing devices, in order to restore synchronism only, have a means for delaying the stepping of the channel separator. Further, no consideration is taken of the case where the synchronizing pattern itself contains an error. If an error of a digit is contained in the synchronizing pattern, the pattern will not produce a response in the synchronizing pattern monitor, with the result that the synchronizing device falls out of operation at least for the period of one frame. Although a remedy for such misoperation is proposed in my copending U.S. application, Ser. No. 98,503, filed Mar. 27, 1961, the arrangement may be improved.

An object of this invention therefore is to provide a synchronizing device for a pulse code transmission system, which is stable, which rarely loses synchronism due to defects in the transmission path, and which rapidly restores lost synchronism.

It is another object of this invention to provide a synchronizing device for a pulse code transmission system which can restore synchronism by immediately resetting a channel separator when the shift in synchronism (either in advance or lag) is within a preselected "immediate reset" range and which can shift the channel separator stepwise or by a certain number of bits to reduce the shift if it is beyond the immediate reset range, and then immediately restore synchronism by resetting the channel separator after the shift has been reduced to fall within the aforesaid immediate reset range.

It is still another object of the invention to provide a synchronizing device for a pulse code transmission system which can restore synchronism within a short restoration time interval by delaying the stepping of the channel separator when stepping is in advance and by advancing the stepping when it is behind the synchronizing pattern.

A further object of the invention is to provide a synchronizing device which includes countermeasures against the loss of synchronism caused when the synchronizing pattern itself is affected by a defect in the transmission path and contains errors.

The present invention is predicated upon the recognition that a shift in synchronism of less than a few bits is the most frequent type of loss of synchronism, and the synchronism restoration time interval can considerably be reduced by immediate resetting such shifts.

According to the invention, a synchronizing device is provided, which achieves both the short synchronism restoration time feature of the start-stop type device and the guarding against a false synchronizing pattern feature of feedback type devices.

The above-mentioned and other features and objects of this invention and the manner of attaining them will become more apparent and the invention itself will be best understood by reference to the following description of embodiments of the invention taken in conjunction with the accompanying drawings, in which.

Figure 1:
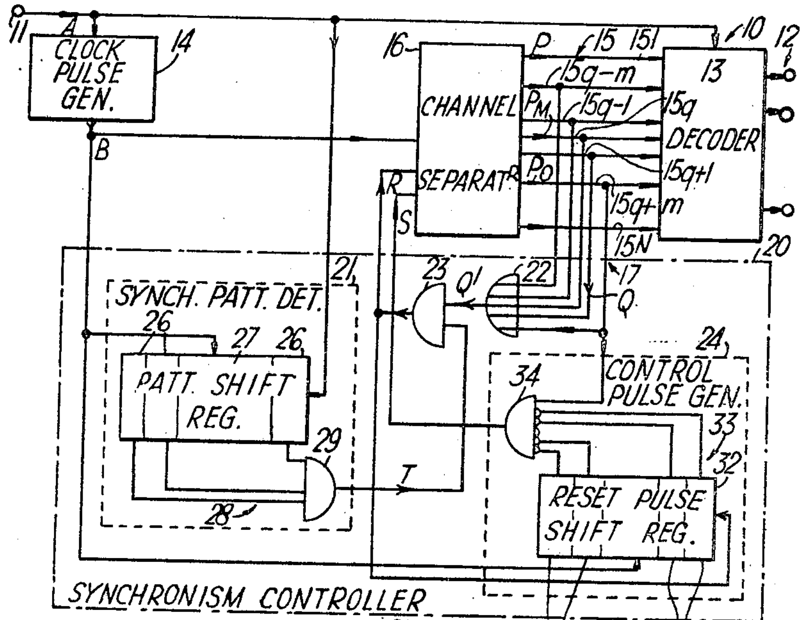
FIG. 1 shows a block diagram of a first embodiment of the invention.
Figure 4:
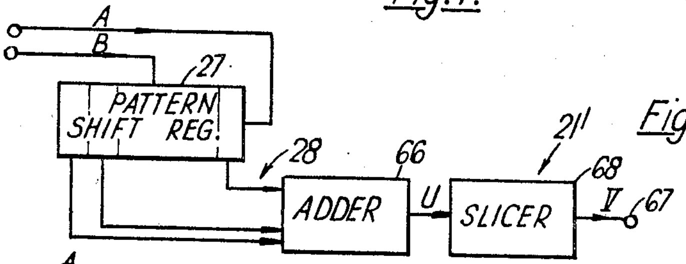
Figure 5:
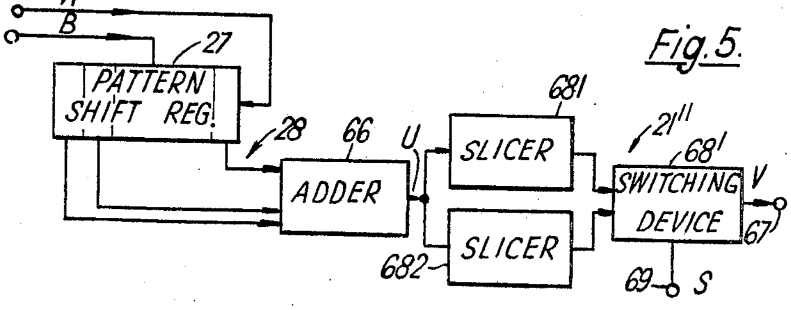
Figures 2, 3:
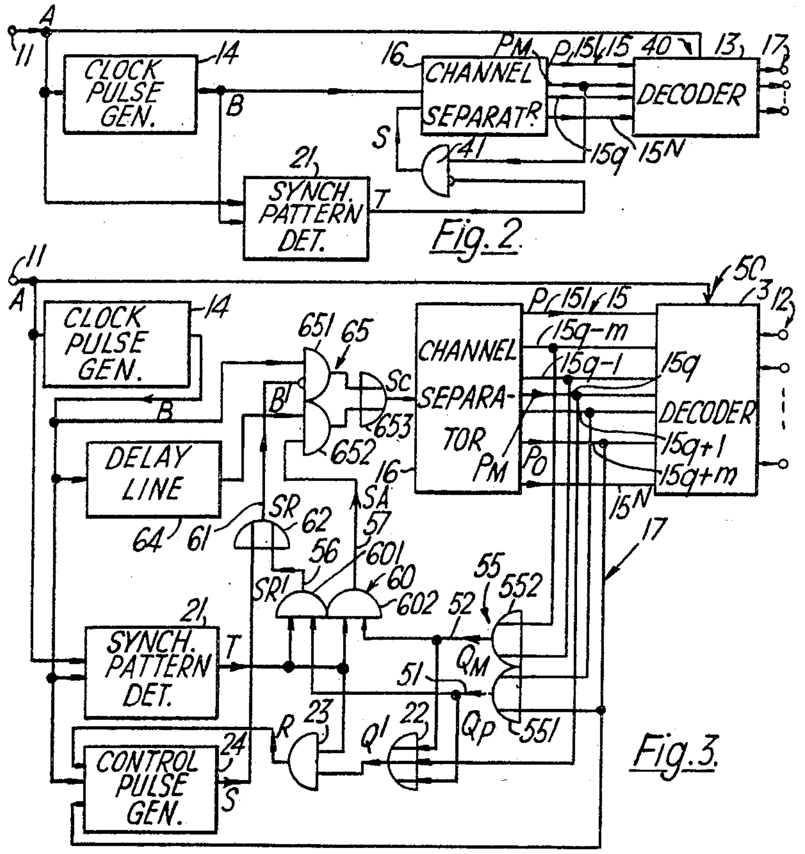
FIG. 2 shows a block diagram of a modification of the first embodiment.
FIG. 3 shows a block diagram of a second embodiment of the invention.
Figure 6:
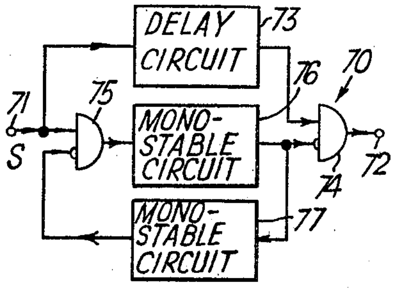

FIGS. 4 and 5 are block diagrams, each showing a modification of a circuit element in the embodiments and the modification shown in FIGS. 1 through 3; and FIG. 6 is a block diagram of another circuit element which may be added to the embodiments of FIGS. 1 through 3.

The invention will be described hereunder in conjunction with a receiver synchronizing device for a time-division PCM transmission system. It will be assumed in the first portion of the following description that the synchronizing pattern (which is a prescribed arrangement or combination of pulses over a predetermined number of time positions assigned to a synchronizing channel in a time sequence of received PCM pulses) is perfect and that the input PCM pulse series A applied to the synchronizing device has, for example, N bits in a frame among which first $q$ bits are assigned to the synchronizing pattern and the remaining bits in the frame are allotted to the information pulse series of I information channels.

Referring now to FIG. 1, a receiving equipment 10 of a time-division multiplex PCM transmission system, comprises an input terminal 11 which is supplied with an input PCM pulse series A. A decoder 13 is provided which has I output terminals 12 for separating respective channels and also for decoding the information pulse series in the input RCM pulse series A supplied thereto. Clock pulse generator 14 is coupled to input 11 and comprises, in turn, a narrow band-pass filter for taking out the bit-frequency component from the input PCM pulse series A supplied thereto and a pulse converter for producing clock pulses B having the same repetition frequency as the bit frequency. Channel separator 16 is coupled to the decoder and clock pulse generator, and comprises a stepping device, such as a ring counter or a rotary switch, having N stepping positions connected to the same number of output lines 15 which consists of from a first to an Nth output line 151 . . . 15N. The lines are led, for convenience of illustration purpose only, to the decoder 13 (although some of them may be dispensed with) and the separator steps in timed response to the clock pulses B supplied thereto to produce a binary one output pulse which may be called a "step" pulse P successively on the output lines 15 recurringly from the first to the Nth output lines 151 . . . 15N during the respective frame periods. In other words, it produces the step pulse P cyclically on the first output line 151 . . . the $q$-minus-1th output line $15q-1$, and the $q$th output line 15$q$ at the time positions, when stepping is in the desired synchronized state of the first bit . . . the penultimate bit, and the last bit of the synchronizing pattern in a frame and then on the $q$-pulse-1th output line $15q+1$, the $q$-plus-2th output line $15q+2$ . . . and the Nth output line 15N at the time positions of the first bit, the second bit . . . and the last bit of the information pulse series in the frame, respectively.

A synchronism controller 20 is also supplied with the input PCM pulse series A, with the clock pulses B, and with such step pulses P as may appear on any one of from the $q$-minus-$m$th to the $q$-plus-$m$th successive output lines $15q-m$ . . . $15q+m$. These shall altogether be identified as range output lines 17 (see FIG. 1) and as may be called a "range" step pulse Q. The synchronism controller sends or feeds back to the channel separator 16 (under circumstances and for purposes to be later described) either a "reset" pulse R or another sort of reset pulse which will be referred to as a "control" pulse S.

Details of the decoder 13, the clock pulse generator 14, and the channel separator 16, which are not only explained in the Patents 3,065,302 and 3,069,504 but are well known and are not essential parts of the invention, will not be expanded upon. The resetting action of the channel separator by a reset pulse is also disclosed in Patent 3,065,302 and is known in the art.

The synchronism controller 20 comprises a synchronizing pattern detector 21 driven by the clock pulses B and adapted to respond to the synchronizing pattern in the input PCM pulse series A supplied thereto to produce a detection pulse or, in this embodiment, an "end-of-pattern" pulse T in coincidence with a time position of the last bit of the synchronizing pattern. A range OR gate 22 produces a "scope" step pulse Q′ whenever the range step pulse Q is supplied thereto. A reset pulse AND gate 23, also in the controller 20, is for logically producing a reset pulse R when a scope step pulse Q′ supplied thereto coincides with an end-of-pattern pulse T; or only when a range step pulse Q appears in coincidence with an end-of-pattern pulse T; or only when a step pulse P on the $q$th output line 15$q$ which may be termed a "range-midway" step pulse $P_M$ appears at any one of the time positions within an "immediate reset range." The latter is determined by selection of the range output lines 17 out of N output lines 15 and is in the instant case, from a time position of the $q$-minus-$m$th bit of the synchronizing pattern to another time position of the $m$th bit in the information pulse series. A control pulse generator 24, also in the synchronism controller, is driven by the clock pulses B for producing a control pulse S when a step pulse P which is supplied thereto through the $q$-plus-$m$th output line $(15q+m)$ and which may be named a "range-end" step pulse $P_O$ does not coincide with any one of the time points within the time interval from a time position of an end-of-pattern pulse T to another time position in arrear of appearance of the end-of-pattern pulse T by $2m$ bit positions or stepping as may be called a "shifted" immediate reset range.

The synchronizing pattern detector 21 comprises a pattern shift register 27 comprising in turn $q$ bistable circuit stages 26, driven by the clock pulses B, for storing $q$ pulses supplied thereto from the input terminal 11. Pattern wirings 28 are connected respectively to one or the other of complementary terminals of the $q$ bistable circuits 26 so that a binary one output pulse may be taken from each of them as soon as a synchronizing pattern has been stored in them. A combination of spatially distributed binary one and zero output pulses may be derived from the bistable circuits when the input PCM pulses stored in them are different from the pulses of the synchronizing pattern. An end-of-pattern AND gate 29 is connected to the pattern wirings 28 for producing an end-of-pattern pulse T.

The control pulse generator 24 comprises a reset pulse shift register 32 which in turn comprises $2m$-plus-1 stages of bistable circuits 31, driven by the clock pulses B, for storing a reset pulse R supplied thereto. This reset pulse appears in coincidence with an end-of-pattern pulse T in such one thereof and at a time position of the succeeding range-end step pulse $P_O$, as may correspond to that output line (if any) among the range output lines 17 on which the step pulse P appeared in coincidence with the end-of-pattern pulse T. Range wirings 33 are connected to the $2m$-plus-1 bistable circuits 31 so that a binary one output pulse may be derived from the one of the $2m$-plus-1 bistable circuits 31 in which a reset pulse R is stored or so that a binary one output pulse may appear at any one of the time positions within the shifted immediate reset range. A control pulse NOT-AND gate 34 is provided at which a range-end step pulse $P_O$ supplied thereto from a prechosen one ($15q+m$) of the range output lines may be blocked when there is a binary one output pulse on any one of the range wirings 33 connected thereto, and may be caused to become a control pulse S and pass on when there is no binary one output pulse, or only when the range-end step pulse $P_O$ appears at any one of the time points outside of the shifted immediate reset range or only when the range-midway step pulse $P_M$ appeared at any one of the time positions outside of the immediate reset range or only when a range step pulse Q did not or does not (when the range step pulse Q is a range-end step pulse $P_O$) coincide with an end-of-pattern pulse T.

It will be understood that application of a range-end step pulse $P_O$ to the control generator 24 is for the purpose of monitoring, by the $2m$-plus-1 bistable circuits 31, whether or not a range-midway step pulse $P_M$ appeared within the immediate reset range. A reset pulse R is stored in the first of the bistable circuits 31 not at a time position of the $q$-minus-$m$th bit of the synchronizing pattern but at a time point of the end-of-pattern pulse T.

A reset pulse R causes, in place of the corresponding one of the clock pulses B, a forward or backward skip stepping of the channel separator 16 to the stepping position of the $q$-plus-$l$th output line $15q+1$. A control pulse S, also in place of the corresponding one of the clock pulses B, causes a forward or backward skip stepping of the channel separator 16 to a stepping position of the $q$th output line 15$q$ or produces a range-midway step pulse $P_M$. If stepping of the channel separator 16 is correct, a range-midway step pulse $P_M$ appears in coincidence with an end-of-pattern pulse T to produce a reset pulse R at a time position of the last bit of the synchronizing pattern. The reset pulse R resets the channel separator 16 at a stepping position of the $q$-plus-1th output line $15q+1$ or causes stepping of a step which is normal stepping. If stepping of the channel separator 16 is in advance or behind the correct stepping within the immediate reset range or if a step pulse P appears on some one of $q$-plus-$l$th to the $q$-plus-$m$th output lines $15q+1$ . . . $15q+m$ or on some one of the $q$-minus-$m$th to the $q$-minus-1th output lines $15q-m$ . . . $15q-1$ in coincidence with an end-of-pattern pulse T, a reset pulse R also appears at the time position of the last bit of the synchronizing pattern. This reset pulse R resets the channel separator 16 also at a stepping position of the $q$-plus-1th output line $15q+1$ or causes backward skip stepping of the channel separator 16, if the stepping was in advance, and forward skip stepping, if behind, to restore synchronism.

It will be recalled that a control pulse S is produced when the stepping out (loss of synchronism) of the channel separator 16 is beyond the immediate reset range or, more strictly, when a range-end step pulse $P_O$ appears at a time position outside of the shifted immediate reset range. It follows therefore that if the channel separator 16 has stepped out for some reason or other beyond the immediate reset range and would have, or actually has, produced a range-midway step pulse $P_M$ at a time position of a $q$-plus-$i$th bit in the input PCM pulse series A ($i$ is greater than $m$ and smaller than N minus $m$), the succeeding range-end step pulse $P_O$ produced at a time position of a $q$-plus-$i$-minus-$m$th bit produces a control pulse S from the control pulse generator 24. The control pulse S resets the channel separator 16 at a stepping position of the $q$th output line 15$q$ or, in other words, makes the channel separator 16 produce a "second" range-midway step pulse $P_{M2}$ at a time position of a $q$-plus-$i$-plus-$m$-plus-$l$th bit and thereafter produces a "second" or the succeeding range-end step pulse $P_{O2}$ at a time position of a $q$-plus-$i$-plus-$2m$-plus-$l$th bit. Thus, a control pulse S retards the stepping of the channel separator 16 by $m$-plus-1 bits relative to the normal stepping which would otherwise be caused by one of the clock pulses B. If the second range-midway step pulse $P_{M2}$ appears within the immediate reset range ($i$ is greater than N minus $2m$ and smaller than N minus $m$), a reset pulse R, produced at a time position of the second range-midway step pulse $P_{M2}$, restores synchronism at once. If not, successive control pulses S produced by every range-end step pulses $P_O$ within the frame period, or within the frame period and the succeeding frame period, will eventually cause the channel separator 16 to produce a range-midway step pulse $P_M$ within the immediate reset range, with the result that a reset pulse R produced in coincidence with the range-midway step pulse $P_M$ restores the synchronism at once.

It will now be understood that the function of the receiving equipment 10 is similar to that of the start-stop type devices initially discussed when the stepping shift of the channel separator 16 is within the immediate reset range and is similar to that of the feedback type device when the shift is beyond the immediate reset range. A large number $m$ of bits on the advance or the delay side of the immediate reset range would result in short restoration time even for a large loss of synchronism, but without enlarging the possibility of the synchronizing device falling into misoperation because of mis-production of a reset pulse R in response to such a combination of pulses in the input PCM pulse series A as may have the same pulse arrangement as the prescribed pulse arrangement of the synchronizing pattern. In an extreme case where the number $2m+1$ is not less than the number N, the synchronizing device becomes substantially the same as that of the start-stop type.

The most preferable number $m$ for the immediate reset range is two (2) for the reasons later to be described. As the case may be, the immediate reset range may cover from a $q$-minus-$m_1$th output line $15q-m_1$ to a $q$-plus-$m_2$th output line $15q+m_2$. Also, the channel separator 16 may skip-step to a stepping position other than the $q$th output line 15$q$ such as the $q$-minus-$m$th output line $15q-m$ or the $q$-plus-$3m$th output line $15q+3m$.

FIG. 2 is a modification of the device of FIG. 1 with the number $m$ being zero and the device comprising additionally (like parts are similarly designated) a control pulse NOT-AND gate 41 which denies passage of a range-midway step pulse $P_M$ supplied thereto and permits it to become a control pulse S when the range-midway step pulse $P_M$ coincides and does not coincide respectively with and end-of-pattern pulse T also supplied thereto. So long as stepping of the channel separator 16 is correct, the range-midway step pulse $P_M$ coincides with an end-of-pattern pulse T, with the result that no control pulse S is produced. Upon stepping out of synchronism of the channel separator 16, a range-midway step pulse $P_M$ appears at a time point other than that of an end-of-pattern pulse T, with the result that a control pulse S appears at the time point of the range-midway step pulse $P_M$. The control pulse S resets the channel separator 16 at a position of the $q$th output line 15$q$ and makes the channel separator 16 produce a "second-range-midway step pulse $P_{M2}$." Thus, the channel separator 16 is retained at the $q$th output line 15$q$ or steps back step by step, relative to normal stepping thereof which would otherwise be caused by successive B clock pulses until synchronism is restored.

Referring to FIG. 3, the receiver equipment 50 which incorporates a second embodiment of the invention comprises, besides the parts which are the same as those of the synchronizing device, in the receiver equipment 10 and 40 and which are designated by like numerals, a step position take-out gate group 55 whose inputs are connected to the range output lines 17 (except the $q$th output line 15$q$) and whose outputs are connected to a plus side line 51 and a minus side line 52, respectively. This embodiment also comprises a step position discriminating gate group 60 whose inputs are connected to the plus side line 51, the minus side line 52, and a synchronizing pattern detector 21, respectively, and whose outputs are connected to an advanced step line 56 and a retarded step line or, in the present arrangement, an advancing pulse line 57, respectively. A retarding pulse OR gate 62 has its inputs connected to the advanced step line 56 and control pulse generator 24, respectively, and its output connected to a retarding pulse line 61. Delay circuit 64 is connected to the clock pulse generator 14 for producing another clock pulses B' delayed by about a half of the recurring period of the clock pulses B. Finally, this embodiment also includes a step control gate group 65 whose inputs are connected to the clock pulse generator 14, delay circuit 64, retarding pulse line 61, and advancing pulse line 57, respectively, and whose output is connected to the channel separator 16.

The inputs of the range OR gate 22 are connected to the advanced step line 51, the $q$th output line 15$q$, and the retarded step line 52, instead of the range output lines 17. The step position take-out gate group 55 comprises an OR gate 551 for supplying a "plus side" pulse $Q_P$ to the plus side line 51 in response to a step pulse P supplied thereto through one of from the $q$-plus-$l$th to the $q$-plus-$m$th output lines $15q-1$ . . . $15q+m$, and another OR gate 552 for supplying a "minus side" pulse $Q_M$ to the minus side line 52 in response to a step pulse P on one of from the $q$-minus-$m$th to the $q$-minus-1th output line $15q-m$ . . . $15q-1$. The step position discriminating gate group 60 comprises a first AND gate 601 for producing an "advanced stepping" pulse $S_R'$ when the stepping of the channel separator 16 is judged to be in advance of the correct stepping position, and a second AND gate 602 for producing a "retarded stepping" pulse $S_R$ when stepping of the channel separator 16 is judged to be behind the correct stepping position. The step control gate group 65 comprises: a step retarding NOT-AND gate 651 which normally lets the clock pulses B pass but inhibits, when a step retarding pulse $S_R$ is supplied thereto, one of the clock pulses B to stop stepping of the channel separator 16 or causes one-step step back thereof relative to the normal stepping which would otherwise be caused by one of the clock pulses B; a step advancing AND gate 652 which normally does not let the delayed clock pulses B' pass but does allow, when supplied with a step advancing pulse $S_A$, one of the delayed clock pulses B' to pass to make the channel separator 16 step one step so that the same may step another step upon application thereto of one of the clock pulses B succeeding the one that resulted in the step advancing pulses $S_A$ so that the same may thus step twice within a clock pulse recurrence period or advance by one step relative to the normal stepping; and a step adjusting OR gate 653 for supplying to the channel separator 16, a "step adjusting" pulse $S_C$ which is normally one of the clock pulses B and is either a "pulse" which represents the non-existence of one of the clock pulses B and/or one of the delayed clock pulses B'.

It is to be noted here that one of the delayed clock pulses B' and a step advancing pulse $S_A$ have a common time interval since each has a width of about a half of the recurring period of the clock pulses B; should such pulses have no common time interval, a delay circuit, not shown, may be disposed between the second AND gate 602 and the step advancing AND gate 652.

If a step pulse P appears in coincidence with an end-of-pattern pulse T on the $q$-plus-2th output line $15q+2$ or (in other words, stepping of the channel separator 16 is two steps in advance of correct stepping) then a plus side pulse $Q_P$ passes through the step position discriminating gate group 60 to become an advanced stepping pulse $S_R'$, which shows that stepping of the channel separator 16 should be delayed and which passing through the retarding pulse OR gate 62 becomes a step retarding pulse $S_R$. The step retarding pulse $S_R$ inhibits, at the step retarding AND gate 651, one of the clock pulses B to delay, by one step, the stepping of the channel separator 16. Consequently, the channel separator 16 produces a step pulse P on the $q$-plus-1th output line $15q+1$ in coincidence with the end-of-pattern pulse T of the next frame period. In this manner, the channel separator 16 can eventually assume correct stepping position.

If stepping of the channel separator 16 is two steps behind the correct stepping position, a minus side pulse $Q_M$ passes through the step position discriminating gate group 60 and becomes a retarded stepping pulse or, in the instant arrangement, a step advancing pulse $S_A$. A logical product of at least portions of the step advancing pulse $S_A$ and one of the delay clock pulses B' formed at the step advancing AND gate 652 causes one step stepping of the channel separator 16 before stepping thereof caused by one of the clock pulses B succeeding the one that produced the step pulse P on the $q$-minus-2th output line $15q-2$. The succeeding one of the clock pulses B again causes stepping of the channel separator 16. Consequently, the channel separator 16 advances by one step to produce a step pulse P on the $q$-minus-1th output line 15$q-1$ in coincidence with the end-of-pattern pulse T of the next frame period. In this manner, the channel separator 16 can eventually reach correct stepping. If a step pulse P appears on none of the range output lines 17 in coincidence with an end-of-pattern pulse T, or, in other words, stepping of the channel separator 16 is beyond the immediate reset range, then a control pulse S appears in coincidence with a range-end step pulse $P_O$ which, in the present case, passing through the retarding pulse OR gate 62 becomes a step retarding pulse $S_R$. Consequently, stepping of the channel separator 16 is delayed by one step relative to the normal stepping.

Control pulses S appear in the successive frame periods, until a step pulse P appears on the $q$-plus-$m$th output line $15q+m$ in coincidence with an end-of-pattern pulse T so that an advance stepping pulse $S_R'$ takes over the control pulse S to further delay the stepping of the channel separator 16 to eventually restore correct stepping. If a step pulse P appears on the $q$th output line 15$q$ in coincidence with an end-of-pattern pulse T or, in other words, stepping of the channel separator 16 is correct, then no output pulse is produced from the control pulse generator 24 as well as the step position take-out gate group 55 and hence the step position discriminating gate group 60. Consequently, the clock pulses B pass through the step control gate group 65 one after another to retain the normal stepping of the channel separator 16.

Unlike the synchronizing device in the receiver equipment 10, the synchronizing device in this receiver equipment 50 does not have the function of immediately resetting the channel separator 16 when the stepping out is within the immediate reset range; neverthelesss, it can restore synchronism equally well both upon stepping advance and stepping lag.

In the above explanation, it has been assumed that the synchronizing pattern in the input PCM pulse series A is not disturbed and is detected by the synchronizing pattern dectector 21 without fail. In other words, no consideration has been taken of the fact that the synchronizing pattern might colapse because of defects in the transmission line.

Referring now to FIG. 4, a synchronizing pattern detector 21' is shown which is obtained by modifying the synchronizing pattern detector 21 of the receiver equipment 10, 40, and 50 by accounting for the possibility of the collapse of the synchronizing pattern. It comprises the pattern shift register 27 and the pattern wirings 28 which are like parts to the synchronizing pattern detector 21. In place of the end-of-pattern AND gate 29, a serial connection of an adder 66, whose inputs are connected to the pattern wirings 28, so as to produce from time to time a sum pulse U whose electric quantity (voltage) is the sum of those of the binary one output pulses on the pattern wirings 28, and a slicer 68 connected to a pattern-detector output terminal 67 so as to supply thereto a "preliminary end-of-pattern" pulse T′ only when the voltage of the sum pulse U exceeds a predetermined slice level $V_O$. If a portion of voltage of the sum pulse U which would be produced in response to one of the binary one output pulses on the pattern wirings 28 is designated by $v$, a voltage V which is produced from the adder 66 and supplied to the slicer 68 when a synchronizing pattern has just been registered in the pattern shift register 27, will become $qv$ when the registered synchronizing pattern is correct. The voltage V will become $(q-1)\ v$ and $(q-2)\ v$ when there is one-bit error and two-bit errors in the synchronizing pattern, respectively. If the slice level $V_O$ is seat at a value which is smaller than $(q-1)\ v$ and not smaller than $(q-2)\ v$, a preliminary end-of-pattern pulse T′ will be produced even if there may be one-bit error in the synchronizing pattern. If set at a value which is smaller than $(q-2)\ v$ and not smaller than $(q-3)$, $v$, a preliminary end-of-pattern pulse T′ will be produced even if there may be as large as two-bits errors in the synchronizing pattern. Thus, the synchronizing pattern detector 21′ may be composed by selection of the slice level $V_O$ so as to detect a synchronizing pattern even when there may be the described errors in the synchronizing pattern.

Lowering of the slice level $V_O$ in the modified synchronizing pattern detector 21′ will expand the allowance for the errors which might be contained in the synchronizing pattern in the input PCM pulse series A, while it will augment the possibility of misdetection of a false synchronizing pattern which may consist either of a part of a true synchronizing pattern and a part of a pulse combination of an information signal preceding or succeeding the synchronizing pattern. The slice level $V_O$ can therefore not be lowered too much, and it is further restricted in connection with the number $m$ of a set of range output lines 17 for reasons which follow.

It will now be assumed that the synchronizing pattern is "1110010" which is an example of a seven-bit pseudo random sequence for details (reference may be had to R. H. Barker's paper entitled "Group Synchronization of Binary Digital Systems," in "Communication Theory," published by Butterworth Scientific Publications, 1953, pp. 273–287) considered suitable for synchronizing patterns. Moreover, it is to be noted that inasmuch as there are pulses of information signals continuing in advance and behind a synchronizing pattern, a voltage V′ of the sum pulse U supplied to the slicer 68 will assume from time to time various values while a synchronizing pattern supplied bit after bit to the pattern shift register 27 is going to be completely registered and then cleared out. By taking the time origin at the time point when a synchronizing pattern has been completely registered in the pattern shift register 27 and by representing, with the number $n$ of bits, the time interval prior and subsequent to the time origin, the disribuion of probabiliies of the voltage V′ of the sum pulse U as determined by the time interval $n$ are given by Table 1 for a synchronizing pattern containing no errors.

TABLE 1

| V′ n | o | ±1 | ±2 | ±3 | ±4 | ±5 | ±6 | ±7 or more |
|---|---|---|---|---|---|---|---|---|
| 7v | 1 | | | | | | | 1/128 |
| 6v | | | | | | 1/32 | 1/64 | 7/128 |
| 5v | | | | 1/8 | 1/16 | 5/32 | 3/32 | 21/128 |
| 4v | | 1/2 | 1/4 | 3/8 | 1/4 | 5/16 | 15/64 | 35/128 |
| 3v | | 1/2 | 1/2 | 3/8 | 3/8 | 5/16 | 5/16 | 35/128 |
| 2v | | | 1/4 | 1/8 | 1/4 | 5/32 | 15/64 | 21/128 |
| 1v | | | | | 1/16 | 1/32 | 3/32 | 7/128 |
| 0 | | | | | | | 1/64 | 1/128 |

It will be observed from Table 1, that when a perfect synchronizing pattern has been completely registered in the correct position of the pattern shift register 27 or when no error is contained in the synchronizing pattern and $n$ is zero, the voltage V′ is $7v$, that when $n$ is $\pm 1$ or the store is one bit in advance or behind the correct position, the voltage V′ is either $4v$ or $3v$, and that when $n$ is $\pm 2$ or the shift is two bits, the voltage V′ is one of $4v$, $3v$, and $2v$. If now there is an error in some one bit of the synchronizing pattern "1110010," a similar table will result from calculation of the probabilities. According to such a table or in view of the fact that if an error of one bit is contained in a synchronizing pattern and $n$ is 1, the maximum possible voltage V′ may become $5v$, it will be seen that when $n$ is zero, the voltage V′ is $6v$; that when $n$ is $\pm 1$, the voltage V′ is one of $5v$, $4v$, $3v$, and $2v$; that when $n$ is $\pm 2$, the voltage V′ is one of $5v$, $4v$, $3v$, $2v$ and $1v$; and that when $n$ is $\pm 3$, the voltage V′ is one of $6v$, $5v$, $4v$, $3v$, $2v$ and $1v$. If the slice level $V_O$ is set at $6v$ (more strictly, smaller than $6v$ and not smaller than $5v$), the slicer 68 cannot discriminate whether $n$ is zero and at most a one-bit error is contained, or no error is contained and $n$ is $\pm 5$ or more, or an error of one bit is contained and $n$ is $\pm 3$ or more and consequently, it can only be serviceable for producing an end-of-pattern pulse T when used together with range output lines 17 whose number $m$ is smaller than three (3). With smaller slice level $V_O$, a preliminary end-of-pattern pulse T′ is produced in various cases so that the output pulse of the modified synchronizing pattern detector 21′ cannot be used as an end-of-pattern pulse T.

For example, a lower slice level $V_O$ of $5v$ makes it impossible to discriminate whether $n$ is zero and errors are present at most at two bits, or no error is contained and $n$ is $\pm 3$ or more, or an error of one bit is contained and $n$ is $\pm 1$ or more, and so is not adaptable in a modified synchronizing pattern detector 21′ for use in either of the receiver equipments 10 or 50 but is applicable only to the one (the modified receiver equipment 40) where the number $m$ for the range output lines 17 is zero.

It is therefore preferable to choose $6v$ for the slice level $V_O$ and two (2) for the number $m$ for receiver equipments 10 and 50. Two (2) for the number $m$ is also preferable because in practice, a one-bit shift on the forward and the rearward sides of stepping of the channel separator 16 is most probable and more than three-bit shift is relatively scarce.

A synchronizing pattern which is not a pattern of a psuedo random sequence, augments the chance of misoperation of a synchronizing pattern detector. In case of a seven-bit pattern "1111111," the voltage V′ of the sum pulse U produced in the case of a maximum error of one bit contained in the synchronizing pattern, $7v$ or $6v$ when $n$ is zero, and $7v$, $6v$, or $5v$ when $n$ is $\pm 1$, with the result that the discrimination of even these two cases is impossible with the slice level $V_O$ set at as high as $7v$. It follows therefore that in case a modified synchronizing pattern detector 21′ is used, it is very desirable to use a pseudo random synchronizing pattern sequence.

The probability of the appearance of the same pattern as the synchronizing pattern in the input PCM pulse series A is $(1/2)q$. The probability of production of a false output pulse by a synchronizing pattern detector is $(1/2)q$ if $n$ is zero and no error is allowed in the synchronizing pattern. With an error of one bit allowed, such probability of misproduction increases to $q(1/2)^q$ and becomes a fairly large value (such as 0.18) for a seven-bit synchronizing pattern.

Referring to FIG. 5, a synchronizing pattern detector 21″ is shown which is a further modification of the modified synchronizing pattern detector 21′ to be used in combination with the receiving equipment 10 of FIG. 1 where the range output lines 17 covers $\pm 2$ step positions and so that this probability is reduced as far as possible, it comprises a parallel combination of a first and a second slicer 681 and 682 (in place of the slicer 68 of the modified synchronizing pattern detector 21') and a switching device 68' for selecting under control of a control pulse S, supplied thereto through a control pulse input terminal 69, one of the outputs of the slicers 681 and 682 as a preliminary end-of-pattern pulse T'.

It will now be assumed that the synchronizing pattern is a seven-bit pseudo random sequence, that the slice level $V_{01}$ of the first slicer 681 is $6v$ and that $V_{02}$ of the second slicer 682 is $7v$. The switching device 68 is so arranged that it delivers (to the output terminal 67) a preliminary end-of-pattern pulse T' from the first slicer 681 when there is no control pulse S and from the second slicer 682 when there is such a control pulse.

The further modified synchronizing pattern detector 21'' derives an end-of-pattern pulse T when there is no control pulse S or when shift, if any, of stepping of the channel separator 16 is within +2 bits from the correct position, in response to a synchronizing pattern containing at most an error of one bit and while the shift exceeds +2 bits, in compliance with a correct synchronizing pattern without even allowing an error. It may now be understood that with the further modified synchronizing pattern detector 21'' it is possible to reduce the probability $q(1/2)^q$ of the misproduction of an end-of-pattern pulse T to $(1/2)^q$ even if the synchronizing device 21'' may produce a preliminary end-of-pattern pulse T' in response to a false synchronizing pattern while the shift is within the immediate reset range.

With either of the synchronizing pattern detectors 21' and 21'', an error of at most one bit is allowable. It follows therefore that if errors should be present at two or more bits in the PCF pulse series, due to a line detect caused by a relatively long-persisting noise, a false control pulse will be produced to disturb the correct stepping of the channel separator 16 at the time point of the range-end pulse $P_O$ because of the lack of production at the end-of-pattern pulse T by the synchronizing pattern detector and of the reset pulse R. An effective countermeasure for such undesired stepping out is that a pulse retaining circuit be disposed in the path of a control pulse S, such as disclosed in my previously mentioned copending application, Ser. No. 98,503.

Referring now to FIG. 6, a pulse retaining circuit 70 is shown therein. This circuit is employed by connecting input terminal 71 and output terminal 72 to the output of the control pulse generator 24 and a control pulse input terminal of the channel separator 16, respectively, in the receiving equipment 10 (FIG. 1); to the output of the control pulse NOT-AND gate 41 and the control pulse input terminal of the channel separator 16, respectively, in the receiving equipment 40, with the modified synchronizing device (FIG. 2) or to the output of the control pulse generator 24 and the input of the retarding pulse OR gate 62, respectively, in the receiving equipment 50 (FIG. 3). A control pulse S applied to the input terminal 71 is supplied via a delay circuit 73 to an output NOT-AND gate 74 and is supplied directly to an input NOT-AND gate 75. The output of the input NOT-AND gate 75 is applied to a first monostable circuit 76 which produces a first output pulse continuing from the time of application thereto of the control pulse S for a predetermined time interval (such as, for example, shorter than a frame period by at most $m$-bit intervals). The first output pulse is supplied to the output NOT-AND gate 74 as the inhibiting input thereof and to a second monostable circuit 77 which produces an output pulse continuing from the time of either the application of the control pulse S, or the end of the first output pulse, to the time a predetermined time interval (such as, for example, $m$-bit intervals) after the end of the first output pulse. The second output pulse is supplied to the input NOT-AND gate 75 as the inhibiting input. The delay time of the delay circuit 73 is so chosen that the control pulse S first applied may be blocked at the output NOT-AND gate 74.

The arrangement of the pulse retaining circuit 70 is therefore such that even if a control pulse S is produced in coincidence with a range-end pulse $P_O$ because no reset pulse R was produced due to an error of two or more bits contained in the synchronizing pattern, and notwithstanding the fact that stepping of the channel separator 16 is correct, the control pulse S will not be supplied to the channel separator 16 to produce an undesirable collapse of synchronism of the receiver device. If a control pulse S is produced because of true stepping out of synchronism beyond the immediate reset range, then the control pusle S and the succeeding control pulses which have been produced during a frame period after the first control pulse S, will not be supplied to the channel separator 16 but rather another control pulse S, produced about a frame period after the first control pulse S (which is supplied to the pulse retaining circuit 70 after the input NOT-AND gate 75 was blocked), is supplied to the channel separator 16. In other words, the first control pulse S is retained for a predetermined pulse retaining time of about a frame period which is determined by selection of the widths of the first and the second output pulses. By selection of the output pulse widths, it is possible to obtain a pulse retaining time of as long as a number of frame periods. If the pulse retaining time is set a value which is a little shorter than $m$-bits intervals, it is possible to obviate the undesired stepping out, even if a synchronizing pattern of a particular frame may have an error of two or more bits, and to effectively utilize the succeeding control pulses which will follow a true control pulse S although the first time control pulse S is retained or not supplied to the channel separator 16 by the pulse retaining circuit 70.

In the foregoing, the invention has mainly been explained in conjunction with a time-division multiplex PCM transmission system. It is to be understood as has been mentioned in the preamble of the specification, that the invention is also applicable to a so-called digital information transmission system, electronic computer, digital information storing device, and others.

What is claimed is:

1. A synchronizing device comprising:

(a) an input terminal supplied with a time sequence of input pulses including recurring synchronizing patterns, each pattern being composed of pulses distributed in a prescribed arrangement over a first predetermined number of time positions among time positions spaced by a preselected time interval and being disposed apart from the preceding one by an integral multiple of said preselected time intervals;

(b) a clock pulse generator supplied with said input pulses for generating clock pulses occurring at said time positions;

(c) a stepping device which has stepping positions equal in number to said first predetermined number plus said integral multiple and which is supplied with said clock pulses for stepping and producing a step pulse cyclically on said stepping positions at each of said time positions, said stepping positions comprising a second predetermined number of successive stepping positions including one particular stepping position on which said stepping device produces a step pulse at a preset time position in each of said synchronizing patterns when said stepping device is in the desired synchronized state;

(d) a synchronizing pattern detector supplied with said input pulses for producing in response to such pulses included in said input pulses and appearing within the range of said predetermined number of the time positions a detection pulse at each said preset time position, and (e) means coupled to said successive stepping positions and supplied with said detection pulse and with a range step pulse appearing on any one of said successive stepping positions for discriminating at a time position at which a step pulse appears on a prechosen one of said successive stepping positions disposed behind said particular stepping position with respect to the cyclic production of said step pulse, whether said detection pulse has appeared in coincidence with said range step pulse, and for controlling in response to the result of said discrimination said stepping device so as to bring the same into said desired synchronized state.

2. A synchronizing device as claimed in claim 1, wherein said successive stepping positions are a plurality in number and wherein the last-mentioned means comprises:

(a) a reset pulse AND gate supplied with said detection pulse and said range step pulse for producing a reset pulse representing the appearance of detection pulse in coincidence with said range step pulse, and (b) a control pulse generator in turn comprising a reset pulse shift register supplied with said reset pulse and said clock pulse for producing an output pulse at each of those time positions which are at least equal in number to said second predetermined number and means supplied with the output pulse of said reset pulse shift register and the step pulse on said prechosen one of said successive stepping positions for producing a control pulse representing the nonappearance of said detection pulse in coincidence with said range step pulse for bringing the said stepping device into the desired synchronized state.

3. A synchronizing device as claimed in claim 2 further comprising means supplied with said reset pulses for causing said stepping device to step immediately to said desired synchronized state.

4. A synchronizing device as claimed in claim 1, wherein the number of said successive stepping positions is only one and is said particular stepping position and wherein the last-mentioned means consists of a control pulse NOT-AND gate coupled to said particular stepping position and said synchronizing pattern detector for producing a control pulse representing the non-appearance of said detection pulse in coincidence with said range step pulse and controlling said stepping device so as to bring the same into said desired synchronized state.

5. A synchronizing device as claimed in claim 2, wherein the last-mentioned means of claim 1 further comprises:

(a) a first AND gate supplied with said detection pulse and with a step pulse produced after a step pulse has appeared on said particular stepping position for producing an advanced stepping pulse representing the fact that the stepping of said stepping device is in advance of said desired synchronized state;

(b) a second AND gate supplied with said detection pulse and with a step pulse produced before a step pulse will appear on said particular stepping position for producing a retarded stepping pulse representing the fact that the stepping of said stepping device is behind said desired synchronized state;

(c) first means supplied with said advance stepping pulse and said clock pulses for delaying the stepping of said stepping device; and (d) second means supplied with said retarded stepping pulse and said clock pulses for advancing the stepping of said stepping device.

6. A synchronizing device as claimed in claim 1, wherein said synchronizing pattern detector comprises:

(a) a pattern shift register supplied with said input pulses and said clock pulses for registering the input pulses distributed within said first predetermined number of the time positions and for producing at each of these time positions said first predetermined number of spatially distributed output pulses whose spatial distribution is determined by the combination of the registered input pulses;

(b) an adder circuit supplied with said spatially distributed output pulses for producing a voltage determined by the spatial distribution of the input pulses registered in said pattern shift register;

(c) two slicers each supplied with said voltage for producing an output signal only when said voltage is within the range defined by different slice levels; and (d) switching means supplied with the output signals of said slicers and coupled to the last-mentioned means of claim 1 for producing, regardless of whether said synchronizing pattern includes a preselected number of errors, a predetection pulse in place of said detection pulse.

7. A synchronizing device as claimed in claim 2, further comprising means for retaining for a predetermined time interval said control pulse.

References Cited

UNITED STATES PATENTS

| | | |
|---|---|---|
| 3,127,475 | 3/1964 | Coulter. |
| 3,144,515 | 8/1964 | Kaneko. |

THOMAS A. ROBINSON, Primary Examiner

U.S. Cl. X.R.

178—69.5; 325—42